(12) United States Patent
Dempsey

(10) Patent No.: US 11,678,646 B2
(45) Date of Patent: Jun. 20, 2023

(54) ANIMAL RESTRAINING HARNESS, WITH A MECHANISM TO INCREASE CONTROL OVER THE ANIMAL

(71) Applicant: Eamonn Dempsey, Dublin (IE)

(72) Inventor: Eamonn Dempsey, Dublin (IE)

(*) Notice: Subject to any disclaimer, the term of this patent is extended or adjusted under 35 U.S.C. 154(b) by 224 days.

(21) Appl. No.: 17/010,863

(22) Filed: Sep. 3, 2020

(65) Prior Publication Data

US 2022/0061271 A1   Mar. 3, 2022

(51) Int. Cl.
*A01K 27/00* (2006.01)

(52) U.S. Cl.
CPC .......... *A01K 27/002* (2013.01); *A01K 27/005* (2013.01)

(58) Field of Classification Search
CPC ..... A01K 27/002; A01K 27/005; A01K 27/00
See application file for complete search history.

(56) References Cited

U.S. PATENT DOCUMENTS

| | | | | |
|---|---|---|---|---|
| 2,605,744 A * | 8/1952 | Urbanski | ............ | A01K 27/002 119/856 |
| 5,503,113 A * | 4/1996 | Knight | ................. | A01K 27/002 119/856 |
| 5,660,146 A * | 8/1997 | Sporn | ................. | A01K 27/002 119/792 |
| 5,934,224 A * | 8/1999 | Sporn | ................. | A01K 27/002 119/792 |
| 8,051,808 B2 * | 11/2011 | Mugford | ............. | A01K 27/002 119/856 |
| 2007/0034164 A1 * | 2/2007 | Sporn | ................. | A01K 27/002 119/856 |
| 2016/0007570 A1 * | 1/2016 | Stout | .................... | A01K 27/002 119/856 |

* cited by examiner

*Primary Examiner* — Kristen C Hayes

(57) ABSTRACT

An animal restraining harness, that helps to increase control over the animal when attached to a leash or a similar connection point. The harness works to reduce pulling/tension on a leash or a similar connection point by way of a slip system outlined in the claims, when the animal pulls or puts tension on the leash connection point the harness compresses on the animal and the animal is guided towards the point where the leash is being held, thus guiding the animal to that point.

5 Claims, 2 Drawing Sheets

ANIMAL RESTRAINING HARNESS, WITH A MECHANISM TO INCREASE CONTROL OVER THE ANIMAL

FIELD OF INVENTION

The present invention relates to a piece of equipment that an animal, more particularly a dog wears when it is being walked/controlled by an animal handler/person. In particular this invention relates to a dog harness that is used to control the dogs movement when attached to another connection point like a leash.

BACKGROUND TO THE INVENTION

Animals such as dogs live as pets in our modern society. Because they need regular exercise there is a need to bring pets such as dogs to different environments. Bringing an animal such as a dog to certain environments requires the animal handler/owner to control the animal and have said animal attached to a leash that they then have control over, thus restricting the movement of the animal.

Harnesses were originally used for animals to pull carts and carry loads when they would help humans to complete tasks but for the majority of dogs these jobs have become obsolete and we find that most dogs are now domesticated family pets.

In the past the most common way of controlling the pet animal such as a dog was with a collar and leash connection, this does cause some damage to the animal if they put pressure on the leash, by way of applying pressure on the neck and spine of the animal which can lead to health issues for the animal and in some cases also to the person holding the leash.

For this reason the use of animal harnesses has been introduced as a way of controlling the animal and distributing the weight and pressure of the leash around the animals body and reducing the strain on the animals neck and spine.

Because animals using a harness are usually quadruped they have more friction and can pull with greater strength when attached to a harness that has a connection on the back of the animal. For people who have an animal that moves faster then they do the animal will put tension on the leash if the human is not moving as fast and thus, putting tension of the leash which results in pulling the animal handler/person.

For this reason there have been harnesses designed to have a front chest connection to reduce the amount of traction the animal has while attached to a leash, as the animal moves forward the leash starts to move across the animals chest and towards the handler/person.

The problem with these is that the whole harness moves and the animal and handler get moved in the momentum of the animal. There are some harnesses that have changed the positioning of the front straps of the harness to come across the joints of the front of the animal's legs and connect the leash here. The problems with this is; it restricts the movement of the animal's leg joints and thus can cause health issues for the animal and is not advisably for the animal to run in long term. The non-pull system in some of these harnesses compress the strap on the chest as the animal pulls but doesn't have a way of guiding the animal towards the handler.

Other harnesses use connections at the back that are connected around the back of the front legs elbow of a dog where they have axillary lymph nodes, the idea is that the dog will feel pressure/pain and stop pulling.

Accordingly there is a need for a harness that combines a working mechanism that gives the animal handler/person more control over the movement of the animal without interfering with the natural gait of the animal and allows for a better way to guide the animal towards the handler when tension is applied on the leash/point of connection. The animal will learn that moving ahead of the animal handler/person will result in them being guided towards the person and then learn to walk beside them to stop this action from happening.

SUMMARY OF THE INVENTION

According to the invention there is provided, as set out in the appended claims, an animal harness comprising:

a front leash connection point that would be substantially circular in shape and made of a strong metal or a very durable plastic, this is where a leash or similar restrain would attach, the position of this would be at the animals chest, said connection is attached to the centre of a length of strap made of a durable material, the strap then passes through a central point that is substantially triangular or substantially circular in shape and made of a metal or durable plastic, this is located on the chest of the animal, the front leash connection point must be larger than the central point so as not to be able to pass through it, the strap can moves through, one side to the left and the other to the right, these straps then loop under another two points of connection respectively that are substantially square metal/plastic pieces and then move back towards the central point and each attaches there securely, a strong fabric that sits on the back of the animal that straps are connected to, two connections on the front section of the back fabric that are adjustable and move over the animals shoulder/neck and loop through the substantially square metal/plastic pieces stated above, at the back of the fabric there are two buckle connections on the side of this which allows a strap to move under the torso of the animal and connect to it; in the centre of the torso strap an adjustable length of webbing is attached that is then connected to the bottom of the central connection point stated above.

An animal harness as stated above without comprising of an adjustable strap that connects to the centre of the torso strap and is then connected to the bottom of the central connection point.

BRIEF DESCRIPTION OF THE DRAWINGS

The invention will be more clearly understood from the following description of an embodiment thereof, given by way of an example only, with reference to the accompanying drawings, in which.

DETAILED DESCRIPTION OF THE DRAWING

Figure 1:
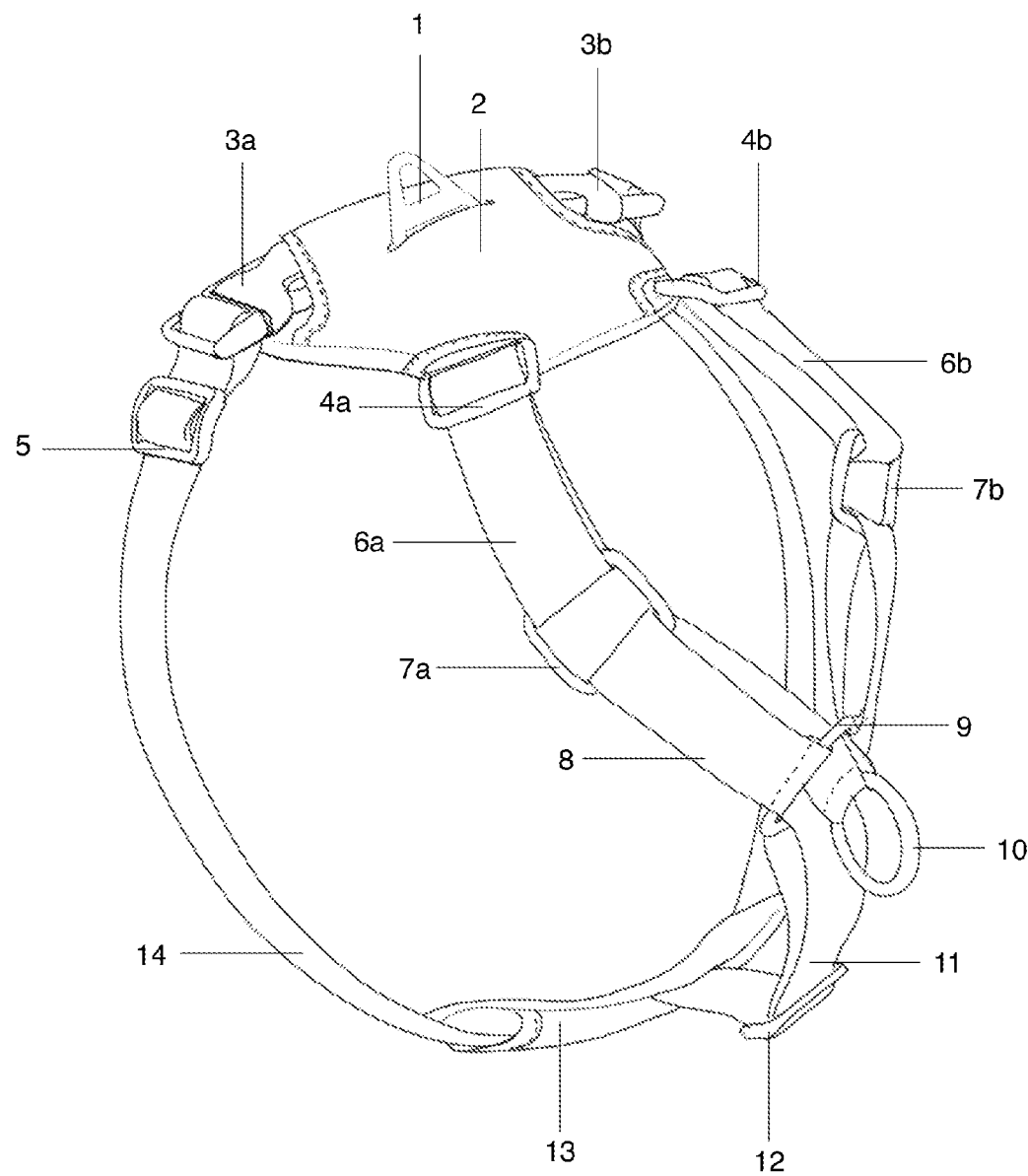
FIG. 1 shows a side view and isometric view of the harness structure according to the invention.

Referring now to the drawings and initially to FIG. 1, there is illustrated an animal harness. The back support and padding area (2) has four main points of connection (3*a* & 3*b*) which have buckles that connect to the strap that moves around the torso of the animal, these buckles make it easy to attach and remove the harness from the animal, the straps have tri-glide (5) pieces allowing the strap length to be adjustable. The front straps (6a & 6b) are attached to the front of (2), they come over the animals neck/shoulder area, they have tri-glide pieces allowing the strap length to be adjustable (4a & 4b). (6a & 6b) strap move around square rings (7a &7b) but could be circle or rectangle shape rings, (6a &6b) loop through the centre of (7a &7b) and are adjusted by the connections (4a & 4b). The front leash connection point (10) is a circle ring but could also be another shape that is connected to the centre of a length of durable material and is positioned on the chest area of the animal (8), this then passes through the centre of the central connection point also positioned on the chest of the animal (9) which in the diagram is a triangle ring but could also be a circle or similar shape, the piece (10) should be larger then (9) so it cannot pass through it. (8) which is attached to (10) at the centre of the strap then moves through (9) and one side of the strap loops through the centre of (7a) and then loops through from the inside to the outer side, the other side of (8) loops through the centre of (7b) and loops through from the inside to the outer side, (8) then connects to the two upper sections of (9) and is secured there in position by stitching or some similar connection system. (11) is a piece of adjustable strapping that loops through the bottom of (9) and the connected to the bottom padding area (13). (11) has a tri-glide (12) to adjust the length of the strapping that connects the bottom padding to (9). (13) the bottom padding area can be attached securely to (14) by stitching or can have a piece of fabric on top that allows the strap (14) to move through it. In the diagram it is demonstrated as having the later. (1) is an attachment ring to connect a leash to when using the back padding as the connection point for the leash. (10) is the front leash connection point for the front of the harness and this has the function of allowing the strap (8) to move when there is tension applied to the leash connection to (10). If there is enough tension the connections (7a & 7b) will touch the connection (9) and can't move any further as the size of (7a & 7b) should be too big to fit through (9). As (8) moves through the centre of (9) because it's connected to (10) and this is attached to a leash the harness starts to move closer to the body of the animal.

Figure 2:
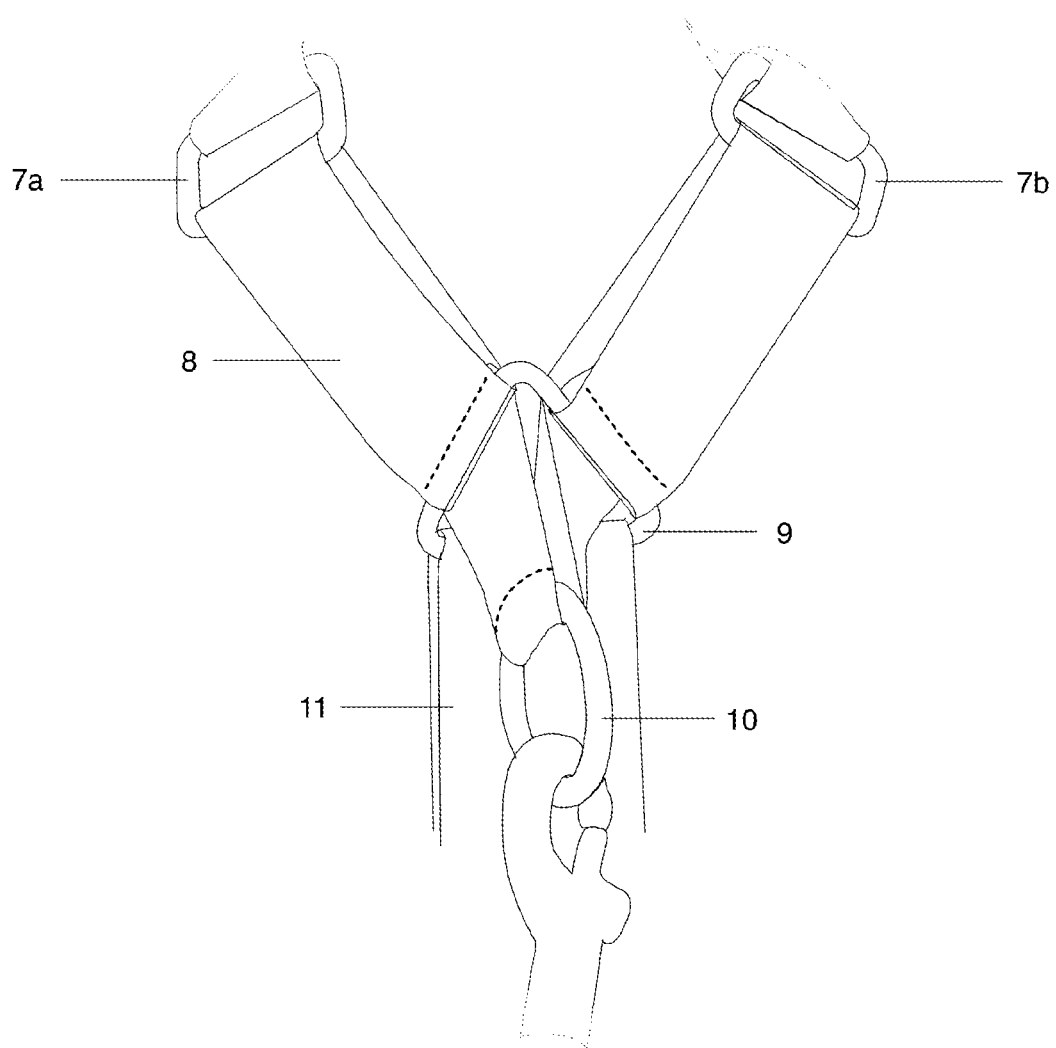
FIG. 2 shows a front view of the main non-pull functional mechanism that's used to connect the leash to the harness.

FIG. 2 illustrates the mechanism that is used to reduce the pulling the animal does when attached to a leash or some other restraint connection point. (10) is the front leash connection point, this can also be another shape as long as it is large enough to not be able to pass through (9) the triangle central point in the centre of the chest area, this could also be a different shape like a circle. (8) is a strap that's connected in the centre through (10) the front leash connection point, it's stitched or secured in a similar fashion at that point, the rest of the strap passes through (9) and (10) can't fit through so it stays in position there, the rest of (8) strap, one side moves to the left and the other the right and they loop through the centre of points (7a & 7b) respectively of the side they move towards, they first loop through the inside and move outside and then are attached to (9) the triangle ring on the two upper sides of the piece and they are secured at this point with stitching or some other similar form of connection. (11) is an adjustable strap that loops through the bottom of (9) the triangle ring and this strap is then connected to the under section of the harness. The other top side of (7a & 7b) are connect by straps looped through the top section and connected to the main top area of the harness and the straps are adjustable.

The mechanism works as the front leash connection is connected to straps that then loops through two connections that are attached to the back piece and neck straps, the strap then moves back to the central point and is connected to a substantially triangular or circle connection, the bottom of this is connected to a piece of adjustable length strap that connects to the under padding and torso straps. As tension on the leash connection is applied, the front leash connection starts to move toward the animal handler and makes the harness get compressed on the animals body and moves the animal towards the handler/person. There is restriction to how compressed it can get, as soon as the square connection touches the triangle connection it can't go any tighter and the animal has to move toward the handler/person.

The combination of the positioning of the neck straps doesn't restrict the movement of the animal if there is no tension on the leash and this allows the dog to run and move with minimum altering to their natural gait. There is a back leash connection for letting the dog have more freedom away from the handler/person when there is no need to use the front connection mechanism.

While the invention has been described herein with reference to preferred embodiments, these have been presented by way of example only. The invention may be varied without departing from the inventive concept.

The invention claimed is:

1. An animal harness comprising:
   a back support area (2);
   a bottom support area (13),
   a torso strap (14) connected to the back support area (2),
   wherein the torso strap (14) is connected at one end to the left-hand side of the back support area (2) by means of buckle (3a) and the other end of the torso strap (14) is connected to the right-hand side of the back support area (2) by means of buckle (3b);
   wherein the torso strap (14) contains slide buckle (5) to allow the strap to be adjusted;
   wherein the torso strap (14) can travel through (13) in use;
   straps (6a, 6b) connected to the bottom left-hand side and bottom right-hand side of the back support area (2) via slide buckles (4a, 4b), the straps (6a, 6b) ending at a centre loop (7a, 7b);
   straps (8) connected from the centre loops (7a, 7b) through a central connector point (9) to the front leash connector point (10);
   wherein one end of the strap (8) is permanently fixed to the central connector point (10), and the other end, after looping through the centre loops (7a, 7b), is fixed to the leash connector point (10);
   an adjustable bottom strap (11) connected from the central connector point (9) to a central point along the length of the bottom support area (13);
   wherein, in use:
   the back support area (2) is placed on the back of the animal;
   the bottom support area (13) is placed under the belly of the animal;
   both areas (2, 13) being connected by the torso strap (14);
   the area created between the strap (14) and straps (6a, 8) contains the front right leg of the animal;
   the area created between the strap (14) and straps (6b, 8) contains the front left leg of the animal;
   the area created between the straps (6a, 6b) contains the head, neck and shoulders of the animal;
   a leash is connected to the leash connector point (10);
   the strap (8) compresses to the animal's body when the leash connector point (10) gets pulled forward, such as when the animal pulls forward on the leash.

2. An animal harness as claimed in claim 1, wherein the leash connector point (10) is larger than the central connector point (9) to prevent the leash connector point (10) slipping through the central connector point (9) in use.

3. An animal harness as claimed in claim 2, further comprising a back leash connection (1) for conventional use of the harness.

4. An animal harness as claimed in claim 3, wherein:
the leash connector point (10) may be circular, triangular or D-ring in shape.

5. An animal harness as claimed in claim 4, wherein:
the central connector point (9) may be circular or triangular in shape.

* * * * *